Feb. 9, 1937.   L. B. ARGUIMBAU   2,069,934
MODULATION METER
Filed Nov. 4, 1935

Lawrence B. Arguimbau
INVENTOR.

BY David Rines
ATTORNEY.

Patented Feb. 9, 1937

2,069,934

UNITED STATES PATENT OFFICE 2,069,934

MODULATION METER

Lawrence Baker Arguimbau, Cambridge, Mass., assignor to General Radio Company, Cambridge, Mass., a corporation of Massachusetts Application November 4, 1935, Serial No. 48,179

12 Claims. (Cl. 179—171)

Devices have been proposed for the measurement of the percentage modulation of a carrier wave in which the wave is rectified and the alternating component of the rectified wave is compared with the direct component. In some of these devices a peak voltmeter is employed to indicate the maximum or minimum value of the rectified wave, and after adjustment of the carrier input to the rectifier to give a predetermined value to the direct component, the reading of the peak voltmeter gives directly the percentage modulation. If the average carrier voltage changes, the input to the rectifier must be changed correspondingly to maintain the direct component of the rectifier at the specified value. Otherwise the peak voltmeter will no longer give the correct value of percentage modulation.

If the peak voltmeter is of the so-called slide-back type, a direct potential, as from a battery or mains-operated power supply, is applied to oppose the rectifier output and an indicating means is employed which is responsive to the difference between the rectified and opposing voltages. In a device of this kind, the opposing voltage at which the indicator operates may be used as a measure of the percentage modulation. Conversely, the opposing voltage may be set at a value corresponding to a certain percentage modulation and the indicator will then operate only when this percentage of modulation is exceeded. In either case, accurate operation depends on the maintenance of a fixed relationship between the average rectified voltage and the opposing voltage. If either of these two voltages varies, readjustment of the apparatus is necessary.

One of the objects of the present invention is to provide an improved modulation meter of the type described which makes use of indicating means responsive to the difference between a direct voltage and an alternating voltage; but which has a calibration independent of variations of applied carrier voltage and of power-supply voltage. Another object is to provide an indicator of modulation in excess of a predetermined value, which is likewise independent of voltage fluctuations. A further object is to provide an improved modulation testing device to show lack of symmetry in modulation by the independent measurement of positive-peak modulation and negative-peak modulation. Other and further objects will be explained hereinafter and will be particularly pointed out in the accompanying claims.

Figure 1:
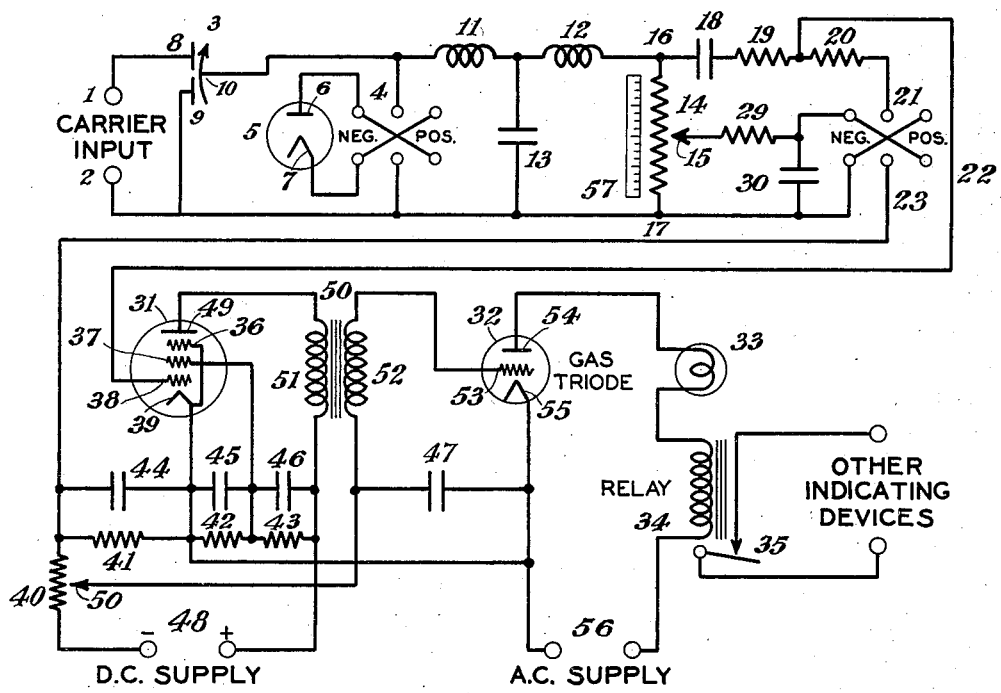
Figures 2, 3:
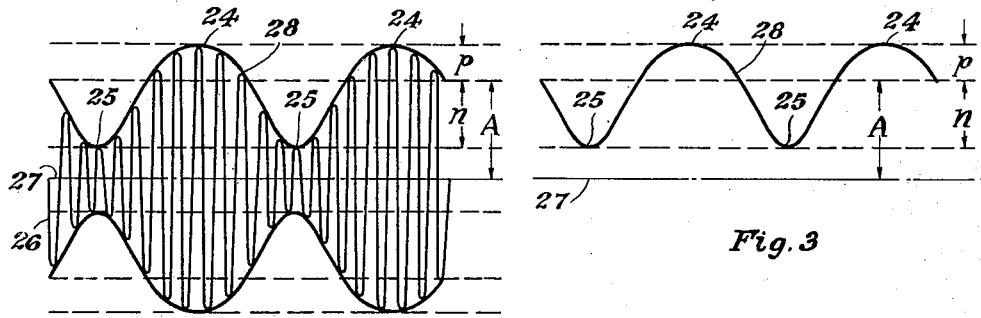

The invention will be explained in connection with the accompanying drawing, in which Fig. 1 is a diagrammatic and simplified view of circuits and apparatus arranged and constructed according to a preferred embodiment of the present invention; Fig. 2 is a diagram illustrating a modulated wave; and Fig. 3 is a diagram of a rectified and filtered modulated wave.

Referring first to Fig. 2, the carrier wave 26 is shown oscillating about the axis 27. The envelope of the wave, shown by the heavy line 28, indicates the manner in which the amplitude of the carrier wave 26 varies in accordance with the modulation. The envelope is shown having maximum points 24 and minimum points 25. The average distance of the envelope 28 from the axis 27, indicated by A, is the carrier component of the modulated wave. The deviations of the maximum and minimum points 24 and 25 from the average value A, indicated by $p$ and $n$, will be referred to, respectively, as the positive peak and the negative peak. If the carrier is symmetrically modulated, the positive peak will be equal to the negative peak, and the ratio of the amplitude of the peak, $p$ or $n$, to the amplitude of the carrier A is the percentage modulation. In general, as in the case illustrated, the positive peak is different from the negative peak. The ratio to the carrier A of the positive peak $p$ is generally known as positive-peak modulation, and the ratio to the carrier of the negative peak $n$ as negative-peak modulation.

If the wave shown in Fig. 2 is demodulated by a rectifier having a linear characteristic, i. e., a rectified output proportional to the carrier input, and if the high-frequency components are then removed by a suitable filter, the output, shown in Fig. 3, will be a replica of the envelope of one-half of the modulated wave, and will consist of a direct component proportional to A and an alternating component proportional to the modulation. The direct component is indicated by A and the two peak values of the alternating component by $p$ and $n$, to correspond to the related quantities in the modulated wave of Fig. 2. It will be observed that the negative peak is the peak of the alternating component of the rectified wave having the opposite polarity from the direct component.

It is evident from Figs. 2 and 3 that the characteristics of a modulated wave may be determined by measurements on the corresponding linearly rectified wave. The present invention, as well as the earlier devices referred to, operates in this manner. In the novel arrangement of the present invention the direct and alternating components of the rectified wave are separated and then recombined in variable ratio with reversible relative polarity, and an improved indicating means is employed which is sensitive to small differences between the two components of the recombined voltages. This arrangement makes the measurement of positive-peak modulation and negative-peak modulation independent of variations in the applied carrier voltage, since both components of the rectified wave will vary in the same ratio.

Referring to Fig. 1, the carrier voltage 1, 2 is applied through a volume control 3 and reversing switch 4 to a rectifier 5, which is shown as a diode having a plate 6, and thermionic cathode 7. Other types of rectifiers well known in the art may be employed, provided that the rectifier and associated circuits are designed so as to have the linear characteristic above considered. The volume control shown is of the capacitive type having two stator armatures 8, 9 and a single rotary armature 10. Although other volume controls may be used, the capacitive type has the desirable characteristics of suppressing the flow of direct current and of presenting an approximately constant impedance to the rectifier, irrespective of setting. The output of the rectifier is passed through a filter consisting of series inductors 11, 12 and a shunt capacitor 13 to remove the carrier frequencies, the filtered voltage, which corresponds to the modulation of the carrier wave, appearing across the resistor 14.

The network of resistances and capacitances shown at the right of the resistor 14 separates the direct and alternating voltages of the rectifier output and makes it possible to recombine these components in variable ratio and to reverse the polarity of one with respect to the other. The resistor 14 is provided with a movable contact 15 and a scale 57 graduated to give the percentage modulation as a function of the position of the contact.

The resistance 29 acting in conjunction with the condenser 30 separates the direct component from the alternating component of the fraction of the rectified voltage determined by the position of the movable contact 15. To accomplish this the resistance 29 is made large in comparison with the resistance 14, and at the same time the reactance of the condenser 30 is made small in comparison with the resistance 29 for all frequencies involved. A variable fraction of the direct component alone thus appears across the condenser 30.

In a similar manner, the condenser 18 removes the direct component so that the entire alternating voltage appears across the resistance 19, 20. This is true irrespective of whether the reversing switch 21 is thrown to the left or to the right, provided that the resistance 19, 20 has a value large in comparison with the sum of the reactances of the condensers 18 and 30 for all desired frequencies. The resistance 19, 20 is made much greater than the resistance 14 in order that the load on the rectifier 5 shall be the same for both the direct and alternating components.

The voltage resulting from the separation and recombination of the direct and alternating components of the rectifier output appears across the conductors 22 and 23 and is applied to the control grid circuit of an electrostatically-shielded thermionic amplifier 31 which controls the operation of a grid-controlled gas-discharge device 32. The gas-discharge tube is shown connected to operate a lamp 33 and a relay 34, which may in turn control other indicating or warning devices through the contact 35.

The amplifier 31 is shown as a pentode having a thermionic cathode 39, an anode 49, a control grid 38, a screen grid 37, and a suppressor or cathode grid 36 connected to the cathode. A source of direct voltage 48, which may be either a battery or mains-operated power supply, is applied across the voltage-dividing resistances 40, 41, 42 and 43 to supply the required electrode voltages to the amplifier 31, and to supply a variable negative bias to the discharge device 32 by means of the movable contact 50 on the resistor 40. The resistances 41, 42, 43 are by-passed for alternating currents by condensers 44, 45, 46, respectively, and the bias voltage applied to the gas triode 32 is by-passed by the condenser 47.

The output of the amplifier 31 is connected through a phase-reversing transformer 50, having a primary winding 51 and a secondary winding 52, to the control-electrode circuit of the gas-discharge relay 32, the transformer secondary 52 being connected in such a direction that a pulse of current flowing through the primary 51 towards the anode 49 of the amplifier 31 will result in the application of a positive potential pulse to the control electrode 53. The tube 32 is arranged to discharge and operate the lamp 33 and the relay 34 whenever the potential of the anode 54 is sufficiently positive with respect to the cathode 55 and the potential of the control electrode 53 is greater algebraically, (i. e., less negative or more positive) than a certain critical value. The tube 32 has the characteristic that once the discharge has started it continues irrespective of the potential of the grid 53, and can be controlled only by the potential of the anode 54. The supply voltage 56 is shown to be alternating, and the tube 32 can discharge, therefore, only on the positive half-cycle. Moreover, since the discharge cannot persist during the negative half-cycle, the continued operation of the lamp 33 and the relay 34 requires that the control electrode 53 shall be periodically at a potential in excess of the above-mentioned critical value. The point at which the discharge commences can be varied by adjusting the position of the movable contact 50 on the resistor 40 to vary the bias voltage applied to the control electrode 53.

For the measurement of negative-peak modulation, switches 4 and 21 of Fig. 1 are thrown to the left. Current can then flow from point 17 through resistor 14 to point 16 and thence through coils 11, 12 to the anode 6 of the diode 5 and thence to the cathode 7 and back to point 17. Since current can flow only in this direction, point 15 will be negative with respect to point 17 and the direct component across the condenser 30 will apply a negative bias to the control grid 38. It has been shown earlier that the negative peak of the alternating component of the rectifier output has a polarity opposite to the direct component, and since, with switch 21 thrown to the left, the two components are combined without phase reversal, the negative peak of that fraction of the alternating component which appears across the resistor 20 will apply positive pulses of voltage to the control grid 38. By varying the bias on the grid 53 by means of the movable contact 50, the tube 32 can be caused to discharge whenever the positive pulse (here the negative-peak) on the grid 38 becomes equal to the negatively-biasing direct component across the condenser 30.

This adjustment of the contact 50 can easily be made in practice by any one of several methods. For example, an audio sinusoidal voltage can be applied between conductors 22 and 23 in series with a direct voltage equal to the peak value of the sinusoidal voltage. The position of the movable contact 50 can then be varied until the lamp 33 just flashes. When this adjustment has been accomplished, the apparatus in the lower half of Fig. 1, including the amplifier 31, the gas triode 32, the lamp 33, and the associated apparatus, constitutes a sensitive indicator to show when the peak of the audio component of the voltage between conductors 22 and 23 is just equal to the direct component. In the discussion which follows it will be assumed that the adjustment of the contact 50 has been made in some suitable manner, such as by the procedure described.

For any given negative-peak modulation of the applied wave, that is, for any given ratio of the negative peak $n$ of the rectifier output to the direct component $A$, it is possible to vary the position of the movable contact 15 until the two components applied to the grid 38 are equal, as indicated by discharge of the tube 32 and operation of the light 33 and relay 34. The fraction of the direct component of the rectifier output between the conductors 22 and 23, or the setting of the movable contact 15, which is required to just cause the lamp 33 to flash is thus a measure of the ratio between the direct and alternating components across the resistor 14, or of the percentage modulation of the carrier wave applied at the input terminals 1, 2. The percentage modulation corresponding to each setting of the contact 15 can thus be marked on the scale 57, indicating the position of the movable contact 15. A measurement of percentage modulation is made, therefore, by adjusting the contact 15 until the lamp 33 or other indicator just operates and by then reading the indication of the calibrated scale 57.

Positive-peak modulation can be measured by a similar procedure when switches 4 and 21 in Fig. 1 are both thrown to the right-hand position. In this case, due to reversal of the rectifier connections, the polarity of the rectified output voltage appearing across the resistor 14 is reversed, with consequent reversal of the direct component appearing across the condenser 30. Due to the simultaneous reversal of the switch 21, however, the direct component still operates to bias the grid 38 negatively, as before. The alternating component, on the other hand, has suffered only one reversal instead of two; so that the positive peak instead of the negative peak now tends to make the control grid positive. For the right-hand position of the switches, therefore, the reading of the scale 57 when the indicator just operates gives the ratio of the positive peak $p$ to the direct component $A$, or the positive-peak modulation.

It will be noted that for either of the measurements described the entire alternating component of the rectifier output voltage is not applied to the amplifier 31 but only that fraction determined by the ratio of the resistance 20 to the sum of the resistances 19 and 20. This is to permit the measurement of modulation in excess of one hundred per cent which can readily occur on the positive peaks. For example, if the modulation is one hundred per cent, the peak of the alternating component across the resistor 14 will be equal to the direct component. If the resistance 20 is five times resistance 19, the two components applied to the amplifier 31 will be equal, with resulting operation of the indicator, when five-sixths of the resistance 14 is between the points 15 and 17. The position of the movable contact 15 for this resistance ratio would then be marked 100 per cent on the scale 57, and the position adjacent to point 16, giving the entire resistance 14, would be marked 120 per cent. This particular ratio of the resistors 19 and 20 has been found satisfactory in practice.

The operation of the device has been described for measurements on a wave modulated by a certain percentage. The arrangement is equally useful when employed to give an indication whenever a certain pre-set percentage modulation is exceeded. For example, if the movable contact 15 is set at the point of the scale 57 corresponding to 80 per cent modulation, the indicator will not operate as long as the percentage modulation is below this value. This will be understood from the fact that the direct component of the rectifier output varies only slightly with the modulation and applies a nearly constant negative bias to the grid 38. It is the peak of the alternating component, corresponding to the modulation, which is effective in overcoming this negative bias to cause the indicator to operate. The indicator, therefore, operates only for percentages of modulation greater than the pre-set value. This feature makes the device particularly useful in the broadcasting of speech or music to warn the operator when the modulation exceeds the value which can be transmitted by the station without objectionable distortion. Operation in this manner can be on either positive-peak modulation or negative-peak modulation.

The characteristics of the amplifier 31 will be considered further with reference to the factors affecting the sensitivity of the entire indicating system to small differences between the two components of the rectifier output. It is on this sensitivity that successful operation of the device depends. It will be observed that the grid 38 is biased negatively by the fraction of the D.-C. supply voltage appearing across the resistor 41. This bias should be sufficient to make the tube operate in the region where the transconductance varies rapidly with the grid bias, but not sufficient to seriously reduce the transconductance. For example a type 57 tube may be used with 250 volts on the plate, 100 volts on the screen, and with the suppressor connected to the cathode. If the negative bias is 4 volts, one volt increase in this bias will approximately halve the transconductance. At the same time the transconductance at 4 volts is almost three-quarters of the transconductance at 3 volts bias, the value recommended by the manufacturers for general amplifier operation. Since the transconductance, and consequently the amplification, varies rapidly with the control-grid bias, a small change in the position of the movable contact 15 will result in a large change in the pulse applied to the grid 53 of the gas-discharge relay 32 as a result of amplification of the positive-peak 24 or negative peak 25 by the pentode amplifier 31. In practice the total D.-C. component across the resistor 14 may be 100 volts, so that the percentage change in either the direct or the alternating component required to cause discharge of the tube 32 may be extremely small. This makes it possible to obtain particularly accurate results in the measurement of percentage modulation, or, conversely, makes the device particularly sensitive to small degrees of overmodulation when used for monitoring purposes.

It will be noted that since both components of the rectifier output vary together when the carrier input 1, 2 changes, and since the indicator is operable by a small difference between the two components, it follows that the accuracy of measurement does not depend on the maintenance of constant carrier input. Furthermore, the separate source of opposing voltage, also subject to variation, required by earlier devices has been eliminated.

It is important that the amplifier 31 and the associated circuits should be so constructed and designed as to prevent the operation of the gas-discharge tube 32 by currents flowing through the interelectrode capacitances of the tube 31 or through other stray capacitances. In the arrangement shown, both the suppressor 36 and the screen 37 are at the alternating potential of the cathode 39, the former by direct connection and the latter by the effect of the by-passing condenser 45. Both of these electrodes, therefore, serve to screen the anode 49, electrostatically, from the control grid 38. This is particularly important, since the alternating voltage applied to the control grid 38 is many times greater than would be employed if the tube were operated in the usual manner as a linear amplifier. It has been mentioned above that the D.-C. component of the output of the rectifier 5 may be 100 volts, and since the percentage modulation may be 100 per cent or even greater, the peak alternating voltage on the grid 38 may likewise be 100 volts. For the type 57 tube, which has been considered, the maximum permissible grid swing for Class A amplification is in the neighborhood of one volt. In the case of the particular voltages mentioned above, the control grid 38 would perhaps be 202 volts negative with respect to the cathode 39 at the moment of the peak of the negative half cycle of the alternating component, and 2 volts negative at the peak of the positive half cycle. The relatively high alternating voltage on the control grid in the present device makes adequate electrostatic shielding of particular importance, in order to make the capacitive anode current small in comparison with the electronic anode current.

It should be noted that the biasing voltage from the D.-C. component of the rectifier output is usually more than sufficient to prevent the flow of plate current except during the relatively small portion of the cycle when the peak of the alternating component is comparable to the biasing voltage. The tube 31 thus serves to amplify relatively small differences between the two components.

Although one particular embodiment of the invention has been described, it is evident to those skilled in the art that many modifications thereof are possible. All such modifications are considered to fall within the spirit and scope of the invention as defined in the appended claims.

What is claimed is:

1. Apparatus for indicating modulation of carrier voltage in excess of a predetermined value including means for deriving from the carrier voltage a direct voltage substantially proportional to the average carrier amplitude, means for deriving from the carrier voltage a voltage having no direct component and corresponding to the modulation, indicating means, means for applying in variable ratio the sum of the two derived voltages to the indicating means, and means for varying the said variable ratio in accordance with the said predetermined value of modulation.

2. Apparatus for indicating modulation of carrier voltage in excess of a predetermined value including means for deriving from the carrier voltage a direct voltage substantially proportional to the average carrier amplitude, means for deriving from the carrier voltage a voltage having no direct component and corresponding to the modulation, indicating means, means for applying the said derived modulation voltage in series with a variable fraction of the said direct voltage to the indicating means, and means for varying the said variable fraction in accordance with the said predetermined value of modulation.

3. Apparatus for indicating modulation of carrier voltage in excess of a predetermined value including means for deriving from the carrier voltage a direct voltage substantially proportional to the average carrier amplitude, means for deriving from the carrier voltage a voltage having no direct component and corresponding to the modulation, indicating means, including a thermionic amplifier and a gas-discharge relay, means for applying in variable ratio to said thermionic amplifier the sum of the two derived voltages, and means for varying the said variable ratio in accordance with the said predetermined value of modulation.

4. Apparatus for indicating modulation of carrier voltage in excess of a predetermined value including means for rectifying the modulated carrier voltage, means for deriving from the rectified voltage a direct voltage substantially proportional to the average carrier amplitude, means for deriving from the rectified voltage a voltage corresponding to the modulation and having no direct component, indicating means, means for applying in variable ratio the sum of the two derived voltages to the indicating means, and means for varying the said variable ratio in accordance with the said predetermined value of modulation.

5. Apparatus for measuring a modulated carrier wave comprising a resistor having a movable contact, means including a rectifier and filter for developing across the resistor a voltage having direct and alternating components substantially proportional, respectively, to the average carrier amplitude and to the envelope of the modulated carrier wave, means including a condenser and a second resistor for obtaining a portion of the alternating component substantially without the direct component, means including a third resistor and a second condenser for obtaining a variable fraction of the direct component determined by the position of the said movable contact substantially without said alternating component, and indicating means arranged to be operated by the sum of said portion of the alternating component and said variable fraction of the direct component.

6. Apparatus for measuring a modulated carrier wave comprising a resistor having a movable contact, means including a rectifier and filter for developing across the resistor a voltage having direct and alternating components substantially proportional, respectively, to the average carrier amplitude and to the envelope of the modulated carrier wave, means comprising two condensers and two additional resistors for separating and recombining in a variable ratio determined by the position of the said movable contact the said direct and alternating components, and indicating means including a gas-discharge device arranged to be operated by the said recombined voltages.

7. Apparatus for measuring a modulated carrier wave comprising a resistor having a movable contact, means including a rectifier for developing across the resistor a voltage having direct and alternating components substantially proportional, respectively, to the average carrier amplitude and to the envelope of the modulated carrier wave, means for separating and recombining in a variable ratio determined by the position of the said movable contact the said direct and alternating components and indicating means arranged to be operated by the said recombined voltages.

8. Apparatus for measuring a modulated carrier wave comprising means for deriving from the modulated wave a voltage corresponding to the modulation, a biasing voltage, an electron-discharge device comprising a cathode, a control electrode, a shielding electrode and an anode to which electronic and capacitive currents may flow, means for applying said derived voltage and said biasing voltage between said cathode and said control electrode, means for varying the ratio of the said applied voltages, means for applying a substantially constant potential to said screening electrode to make said capacitive anode current small in comparison with said electronic anode current, whereby the total anode current is determined by a relatively small difference between said derived voltage and said biasing voltage, and indicating means calibrated in percentage modulation associated with said ratio-varying means.

9. Apparatus for measuring a modulated carrier wave comprising means including a rectifier for developing from the modulated wave a voltage having direct and alternating components substantially proportional, respectively, to the average carrier amplitude and to the envelop of the modulated carrier wave, filtering means for obtaining a portion of the alternating component substantially without the direct component, filtering means for obtaining a portion of the direct component substantially without the alternating component, means for recombining the filtered components, means for varying the ratio of the recombined components, and indicating means arranged to be operated by the sum of the recombined components.

10. Apparatus for indicating modulation of a carrier wave in excess of a predetermined value comprising means including a rectifier for developing from the modulated wave a voltage having direct and alternating components substantially proportional, respectively, to the average carrier amplitude and to the envelop of the modulated carrier wave, filtering means for obtaining a portion of the alternating component substantially without the direct component, filtering means for obtaining a portion of the direct component substantially without the alternating component, means for recombining the filtered components, means for varying the ratio of the recombined components according to the said predetermined value of modulation, and indicating means arranged to be operated by the sum of the recombined components.

11. Apparatus for measuring a modulated carrier wave comprising means including a rectifier for developing from the modulated wave two voltage components substantially proportional, respectively, to the average carrier amplitude and to the envelop of the modulated carrier wave, means for obtaining portions of each component substantially without the other component, means for combining the separate components, means for varying the ratio of the combined components, and indicating means arranged to be operated by the sum of the combined components.

12. Apparatus for indicating modulation of a carrier wave in excess of a predetermined value comprising means including a rectifier for developing from the modulated wave two voltage components substantially proportional, respectively, to the average carrier amplitude and to the envelop of the modulated carrier wave, means for obtaining portions of each component substantially without the other component, means for combining the separate components, means for varying the ratio of the combined components according to the said predetermined value of modulation, and indicating means arranged to be operated by the sum of the combined components.

LAWRENCE B. ARGUIMBAU.